(12) United States Patent  
Tiberio (10) Patent No.: US 7,479,030 B2
(45) Date of Patent: Jan. 20, 2009

(54) QUICK CLIP ASSEMBLY FOR STRAP ELEMENT OF ELECTRICAL RECEPTACLE

(75) Inventor: Patrick J. Tiberio, Huntington, CT (US)

(73) Assignee: Hubbell Incorporated, Orange, CT (US)

( * ) Notice: Subject to any disclaimer, the term of this patent is extended or adjusted under 35 U.S.C. 154(b) by 147 days.

(21) Appl. No.: 11/544,001

(22) Filed: Oct. 6, 2006

(65) Prior Publication Data

US 2008/0083550 A1    Apr. 10, 2008

(51) Int. Cl.
*H02B 1/26*    (2006.01)
(52) U.S. Cl. .......................................... 439/538; 174/66
(58) Field of Classification Search ................. 439/538, 439/539, 536; 174/66, 53, 54
See application file for complete search history.

(56) References Cited

U.S. PATENT DOCUMENTS

| | | | |
|---|---|---|---|
| 2,149,719 A | 3/1939 | Arnst | |
| 2,267,771 A * | 12/1941 | Von Holtz | 439/536 |
| 3,526,703 A | 9/1970 | Tucker | |
| 3,713,071 A * | 1/1973 | Poliak et al. | 439/97 |
| 3,876,821 A | 4/1975 | Pringle | |
| 3,955,463 A | 5/1976 | Hoehn | |
| 4,281,773 A * | 8/1981 | Mengeu | 220/3.2 |
| 4,375,307 A * | 3/1983 | Rock | 439/107 |
| 4,552,421 A | 11/1985 | Drapkin | |
| 4,642,420 A | 2/1987 | Nattel | |
| 4,936,396 A * | 6/1990 | Lockwood | 174/53 |
| 4,983,785 A | 1/1991 | Johnston | |
| 5,170,014 A | 12/1992 | Borsh | |
| 5,675,125 A * | 10/1997 | Hollinger | 174/66 |
| 5,753,858 A * | 5/1998 | Eder et al. | 174/53 |
| 5,907,126 A | 5/1999 | Cancellieri | |

* cited by examiner

*Primary Examiner*—Neil Abrams
(74) *Attorney, Agent, or Firm*—Marcus R. Mickney; Mark S. Bicks; Alfred N. Goodman (57) ABSTRACT

A quick clip assembly for a strap element of an electrical receptacle is provided that expedites mounting of a wall plate to an electrical receptacle. The strap element is connected to an electrical receptacle and has an opening therein to receive a fastener. A resilient member is connected to the strap element such that a free end of the resilient member overlies the strap element opening. The free end of the resilient member flexes and engages the fastener inserted through the strap element opening without substantial rotation.

22 Claims, 6 Drawing Sheets

QUICK CLIP ASSEMBLY FOR STRAP ELEMENT OF ELECTRICAL RECEPTACLE

FIELD OF THE INVENTION

The present invention relates to a quick clip assembly for a strap element of an electrical receptacle. More particularly, the present invention relates to a quick clip assembly having a resilient member attached to the strap element to engage a wall plate fastener received by the strap element. Still more particularly, the present invention relates to a method of quickly and easily securing a wall plate to an electrical receptacle. The quick clip provides expedited mounting of a wall plate to an electrical receptacle.

BACKGROUND OF THE INVENTION

Electrical power is supplied to electrical appliances and other electrical equipment by the insertion of blades of a plug into an electrical receptacle, thereby electrically connecting the electrical equipment to the power distribution lines.

Electrical receptacles generally have a mounting strap that is connected to an electrical box to secure the electrical receptacle to the electrical box. The face plate of the electrical receptacle has openings to receive the blades of the plug to electrically connect the electrical equipment to the power distribution lines. A wall plate is secured to the electrical receptacle to cover and protect the electrical receptacle and the contents of the electrical box, as well as providing an aesthetically pleasing appearance. A threaded fastener is threaded through aligned openings in the wall plate, face plate and mounting strap to secure the wall plate to the electrical receptacle.

Electrical receptacles are typically installed in new commercial and residential construction projects in large quantities. An installer must completely thread each fastener through the wall and face plates and into the mounting strap. Therefore, a lot of time is required to connect a wall plate to each of the installed electrical receptacles. Thus, a need exists for quickly and easily securing wall plates to electrical receptacles.

Accordingly, a need exists for an electrical receptacle to which a wall plate is quickly and easily secured.

SUMMARY OF THE INVENTION

Accordingly, it is a primary objective of the present invention to provide an improved electrical receptacle.

A further objective of the present invention is to provide an improved electrical receptacle to which a wall plate is quickly and easily secured.

A still further objective of the present invention is to provide a quick clip assembly that facilitates securing the wall plate to the electrical receptacle with a fastener.

Still another objective of the present invention is to provide a method of quickly and easily securing the wall plate to the electrical receptacle with a fastener.

The foregoing objectives are basically attained by a quick clip assembly for a strap element of an electrical receptacle. The strap element is adapted to be connected to an electrical receptacle and has an opening therein adapted to receive a fastener. A resilient member is connected to the strap element such that a free end of the resilient member overlies the strap element opening. The free end of the resilient member is adapted to engage and flex when the fastener is inserted through the strap element opening.

The foregoing objectives may also be attained by an electrical receptacle having a quick clip assembly for a strap element. The electrical receptacle has a housing, and a strap element connected to the housing. The strap element has a first opening therein. A resilient member is connected to the strap element such that a free end of the resilient member overlies a portion of the strap element opening. A face plate covers the housing and the strap element. The face plate has a second opening therein. A fastener is received in the second opening in the face plate and in the first opening in the strap element to secure the face plate to the housing. The fastener flexes the free end of the resilient member toward the housing to facilitate retention of the fastener.

The foregoing objectives may also be attained by a method of securing a wall plate to an electrical receptacle. A wall plate is positioned over a face plate of an electrical receptacle such that a first fastener hole in the wall plate is aligned with a second fastener hole in the face plate. A fastener is pushed into the first and second fastener holes such that the fastener engages a resilient member connected to a strap element of the electrical receptacle, thereby securing the wall plate to the electrical receptacle.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

Referring now to the drawings that form a part of the original disclosure.

DETAILED DESCRIPTION OF EXEMPLARY EMBODIMENTS

As shown in FIGS. 1-14, the present invention relates to a quick clip assembly 21 for an electrical receptacle 11. The quick clip assembly 21 includes a resilient member 23 connected to a strap element 31 of the electrical receptacle 11. The strap element 31 is adapted to be connected to an electrical receptacle 11 and has an opening 33 therein adapted to receive a fastener 41. The resilient member 23 is connected to the strap element 31 such that a free end 25 of the resilient member overlies the strap element opening 33. The free end 25 of the resilient member 23 is adapted to flex when engaging the fastener 41 inserted through the strap element opening 33.

Figure 1:
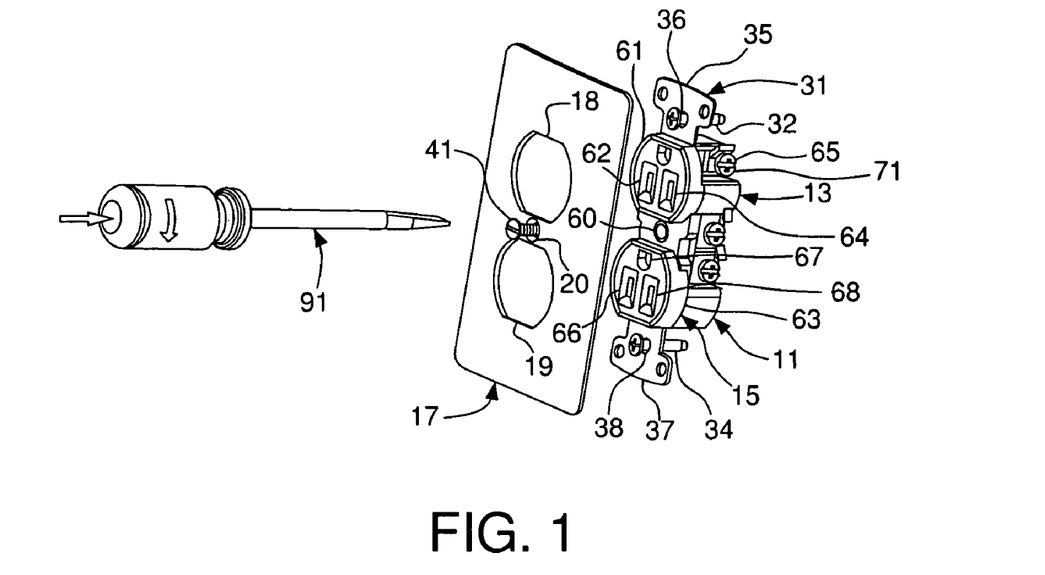
FIG. 1 is an exploded perspective view of a wall plate being secured to an electrical receptacle according to an exemplary embodiment of the present invention.
Figure 2:
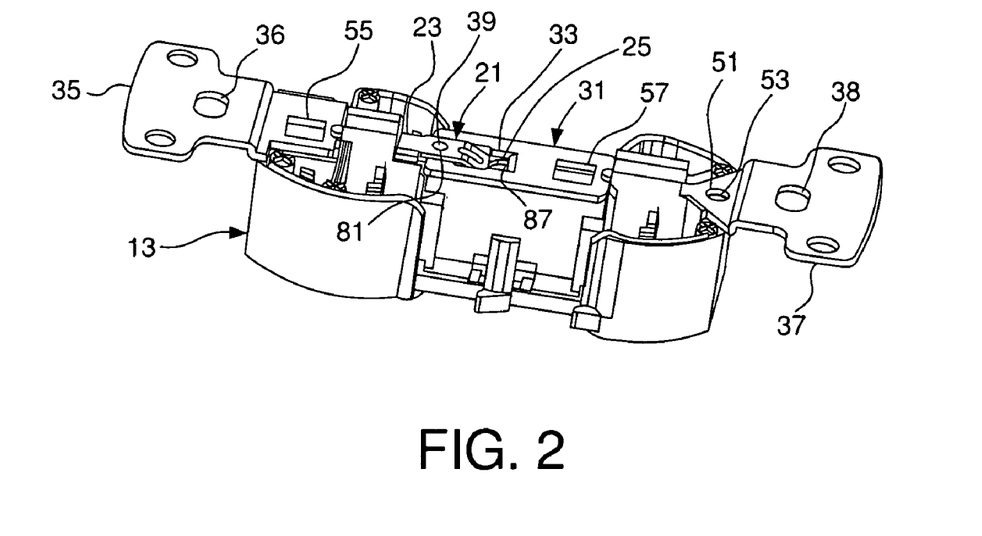
FIG. 2 is a perspective view of a quick clip assembly and strap element connected to an electrical receptacle according to a first exemplary embodiment of the present invention.
Figure 6:
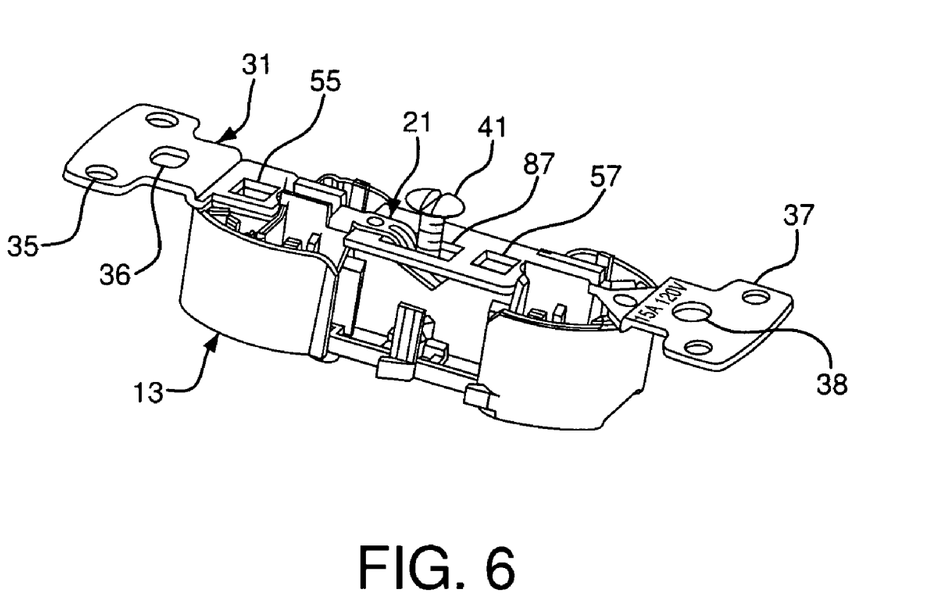
FIG. 6 is a perspective view of the electrical receptacle of FIG. 2 receiving a fastener in which a portion of the electrical receptacle is cut away to more clearly show the quick clip assembly.

As shown in FIGS. 1, 2 and 6, the electrical receptacle 11 has a housing portion 13. Preferably, the housing portion 13 is non-metallic, such as being made of plastic. A face plate 15 is secured to the housing portion 13. A wall plate 17 is adapted to be connected to the electrical receptacle 11, as shown in FIG. 1.

The strap element 31 is received by the housing portion 13, as shown in FIGS. 2, 6, 10, 11 and 14. A first fastener hole 51 in the strap element 31 receives a first fastener 53 to secure the strap element to the housing portion 13. Alternatively, the first fastener hole 51 may receive an upwardly extending post of the housing portion 13 to position the strap element 31 on the housing portion.

The strap element 31 has a first mounting tab 35 and a second mounting tab 37 disposed at opposite ends thereof. A second opening 36 in the first mounting tab 35 is adapted to receive a second fastener 32 to secure the strap element to a conventional electrical box (not shown). A third opening 38 in the second mounting tab 37 is adapted to receive a third fastener 34 to secure the strap element to the electrical box. A ground plate 69 extends downwardly from the strap element 31 and has an opening 70 adapted to receive a ground fastener 71, as shown in FIG. 1. As shown in FIG. 1, the ground plate 69 is disposed outside of the housing portion 13.

Figure 3:
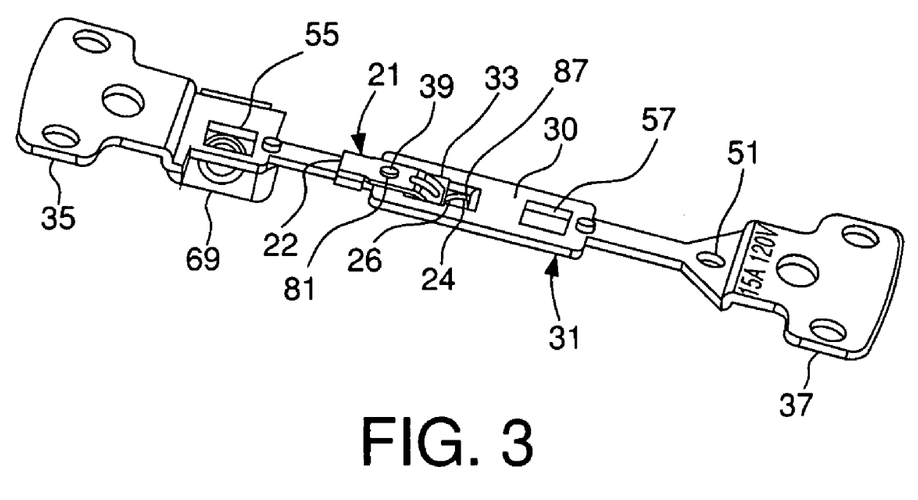
FIG. 3 is a perspective view of a quick clip assembly connected to a strap element of FIG. 2.
Figure 7:
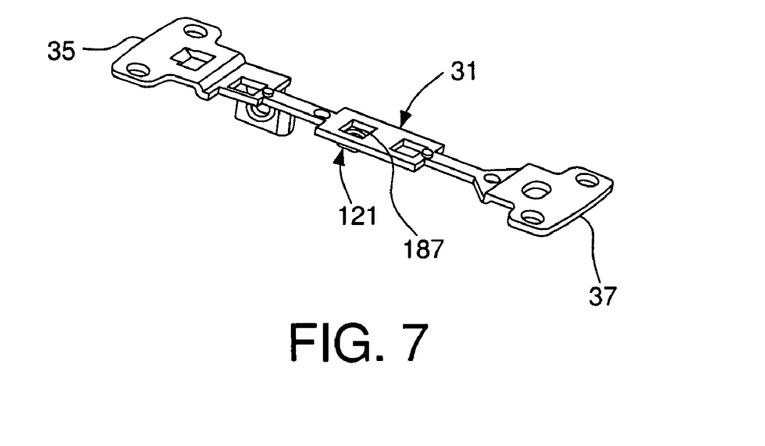
FIG. 7 is a front perspective view of a quick clip assembly and strap element according to a second exemplary embodiment of the present invention.
Figure 8:
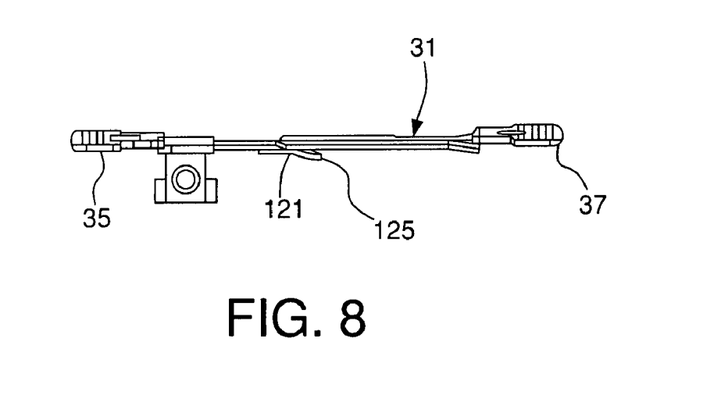
FIG. 8 is a side perspective view of a quick clip assembly and strap element of FIG. 7.
Figure 9:
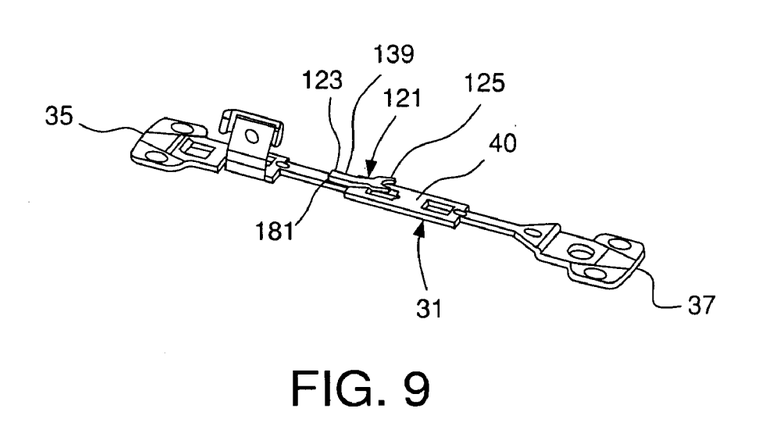
FIG. 9 is a rear perspective view of the quick clip assembly and strap element of FIG. 7.
Figure 10:
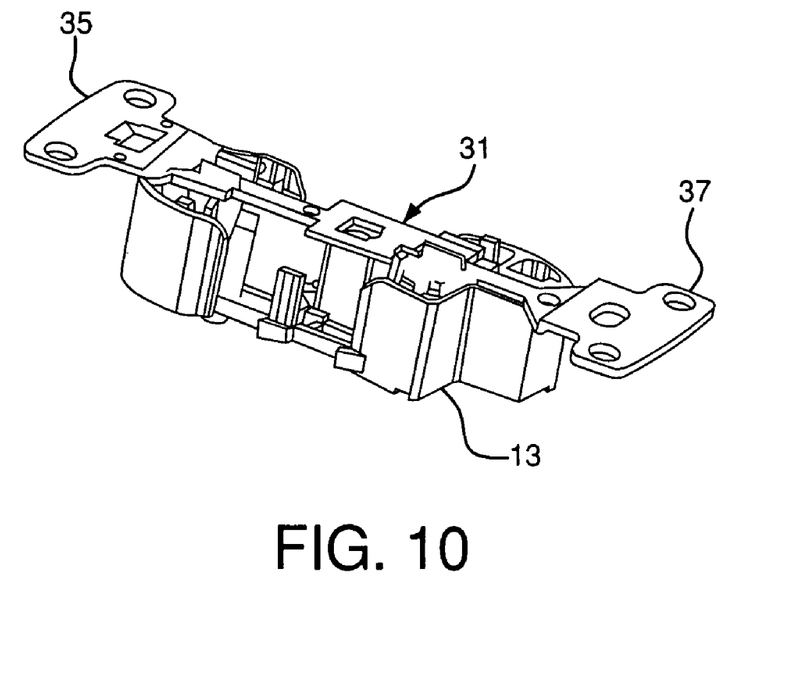
FIG. 10 is a perspective view of the quick clip assembly and strap element of FIG. 7 connected to an electrical receptacle.
Figure 11:
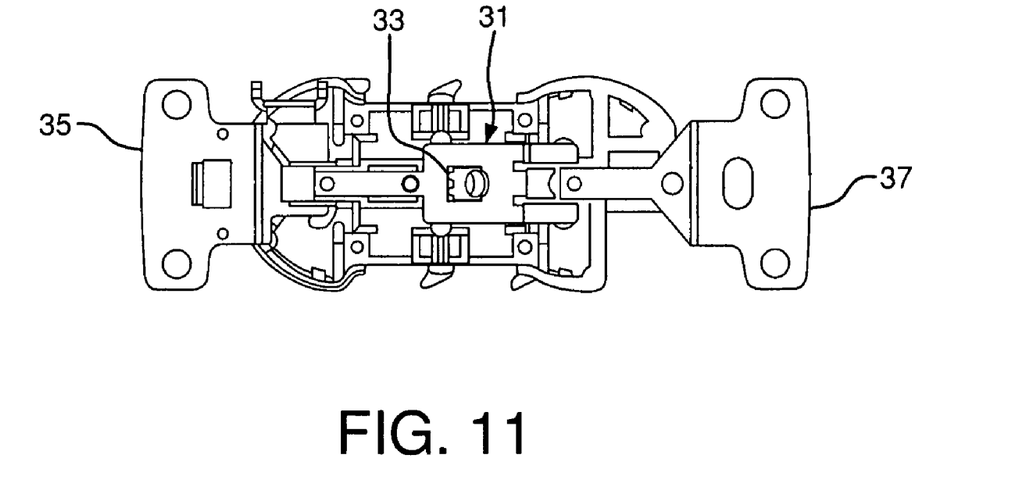
FIG. 11 is a top plan view of the electrical receptacle of FIG. 10.
Figure 12:
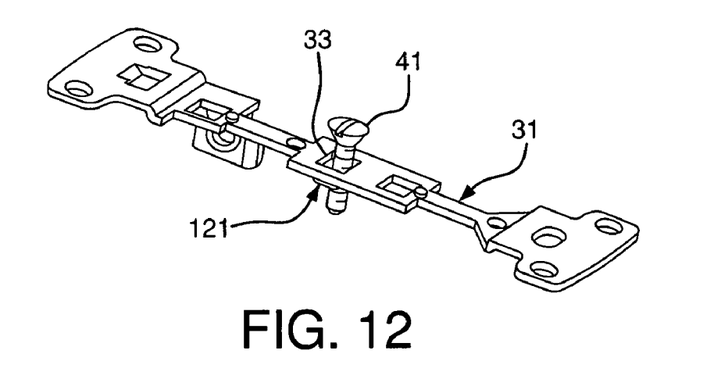
FIG. 12 is a front perspective view of the quick clip assembly and strap element of FIG. 7 receiving a fastener.
Figure 13:
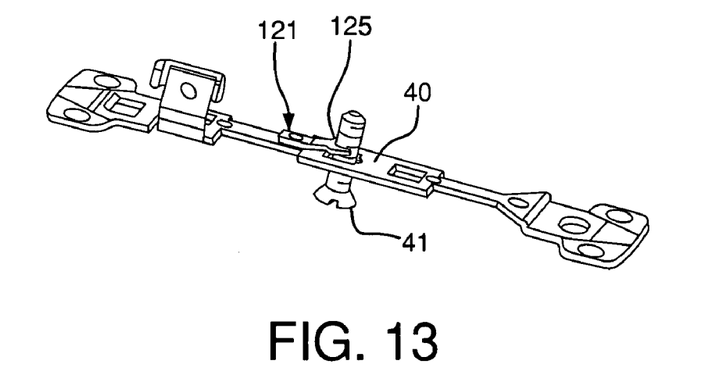
FIG. 13 is a rear perspective view of the quick clip assembly and strap element of FIG. 12.

A first opening 33 in the strap element 31 is adapted to receive the first fastener 41 to secure the wall plate 17 to the electrical receptacle 11. Preferably, a lip 87 extends inwardly from a portion of the first opening 33, as shown in FIG. 3. Alternatively, an arcuate portion 187 may be formed on a portion of the first opening 33 to facilitate receiving the first fastener 41, as shown in FIG. 7. The strap element 31 has an upper surface 30 and a lower surface 40. A first ground opening 55 in the strap element 31 is proximal the first mounting tab 35 and is adapted to receive a grounding prong of a first plug (not shown). A second ground opening 57 in the strap element 31 is adapted to receive a grounding prong of a second plug (not shown). The second ground opening 57 is disposed, for example, between the first ground opening 55 and the second mounting tab 37. The strap element 31 is preferably formed of an electrically conductive metal, such as steel.

Figure 4:
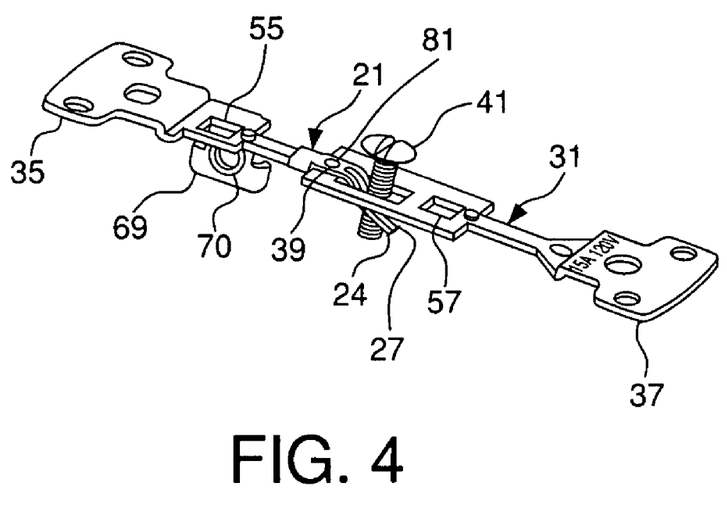
FIG. 4 is a front perspective view of a quick clip assembly connected to a strap element of FIG. 2 receiving a fastener.
Figure 5:
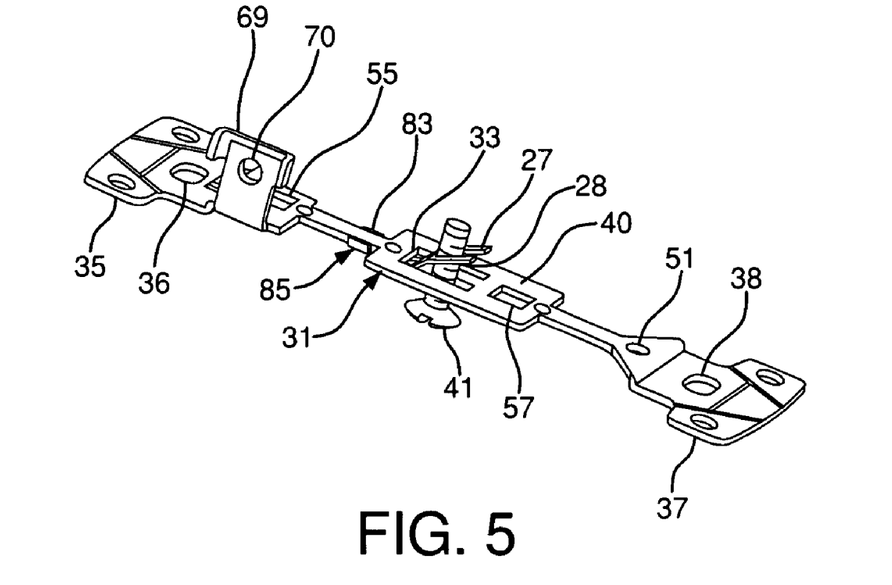
FIG. 5 is a rear perspective view of a quick clip assembly connected to a strap element of FIG. 2 receiving a fastener.

The resilient member 23 is connected to an upper surface 30 of the strap element 31 in a first exemplary embodiment of the present invention, as shown in FIGS. 2-6. The resilient member 23 has a first end 22 secured to the strap element 31 and an opposite free end 24 overlying the first opening 33 in the strap element 31. Preferably, as shown in FIG. 3, the free end 24 of the resilient member 23 extends into the first opening 33. The first fastener 41 is inserted through the first opening 33 in the strap element 31 such that the first fastener engages the resilient member 23. The free end 24 is not fixed such that the free end flexes and moves with the first fastener 41. Preferably, the free end 23 has an arcuate portion 26 adapted to engage the first fastener 41, as shown in FIGS. 4-6. The arcuate portion 26 forms first and second fingers 27 and 28 that receive and preferably extend beyond the first fastener 41.

The resilient member 23 may be secured to the strap element 31 in any suitable manner. Preferably, a protrusion 39 extends upwardly from the upper surface 30 of the strap element 31 and is received by an opening 81 in the resilient member 23. Alternatively, the flexible member 23 may be secured to the strap element 31 by a fastener, such as a screw or rivet, or may be welded thereto. First and second arms 83 and 85 may extend outwardly at the first end 22 of the resilient member that are adapted to wrap around and engage the strap member 31 to further secure the resilient member 23 to the strap element. Preferably, the resilient member 23 is made of a metal, such as spring steel.

The face plate 15 has a first plug portion 61 and a second plug portion 63 adapted to receive the prongs of first and second plugs, respectively. Each of the first and second face portions 61 and 63 has a ground opening 65 and 67, respectively, adapted to receive the ground prong of the first and second plugs. Two vertically oriented openings 62, 64, 66 and 68 in each of the first and second face portions 61 and 63 are adapted to receive the hot and neutral prongs of the first and second plugs, and are aligned with electrical contacts disposed in the housing portion 13. A fastener hole 60 in the face plate 15 is adapted to receive the first fastener 41, as shown in FIG. 1.

The wall plate 17, as shown in FIG. 1, has first and second apertures 18 and 19 adapted to receive the first and second plug portions 61 and 63 of the wall plate 17, respectively. A fastener hole 20 in the wall plate 17 is adapted to receive the first fastener 41.

The quick clip assembly 21 allows the first fastener 41, such as a wall plate screw, to be pushed in instead of being threaded for the entire fastener insertion process. The free end 25 of the resilient member 23 bears against the first fastener 41 to securely retain the first fastener therein, and pushes the first fastener against the lip 87 (FIG. 2) or lip 187 (FIG. 14) of the first opening 33 in the strap element 31. The free end 25 of the resilient member 23 and a portion of the first opening 33 of the strap element 31 engaging the first fastener 41 act as a thread, such that after the first fastener has been pushed inwardly it may be further rotated to further retain the first fastener therein.

In another exemplary embodiment of the present invention, the quick clip assembly 121 may be secured to the lower surface 40 of the strap element 31, as shown in FIGS. 7-14. The quick clip assembly 121 is substantially similar to the quick clip assembly 21 of the exemplary embodiment shown in FIGS. 2-6. A protrusion 139 extends downwardly from the lower surface 40 of the strap element 31 that receives an opening 181 in the resilient member 123. Because the quick clip assembly 121 is secured to the lower surface of the strap element 31, the free end 125 of the resilient member 123 does not need to enter the first opening 33 in the strap element, thereby requiring less material to form the quick clip assembly 121.

Assembly and Disassembly

The quick clip assembly 21 according to an exemplary embodiment of the present invention is shown secured to an upper surface 30 of a strap element 31 in FIGS. 2-6 and a quick clip assembly 121 according to another exemplary embodiment is shown secured to a lower surface 40 of the strap element 31 in FIGS. 7-14.

Figure 14:
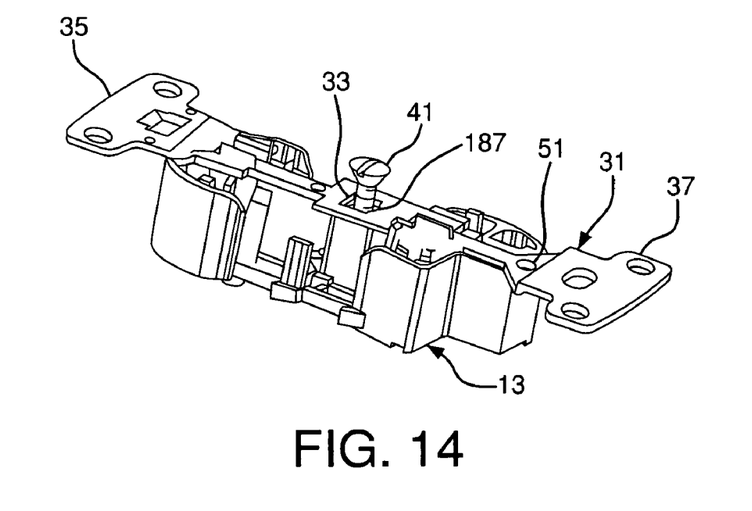
FIG. 14 is a perspective view of the quick clip assembly and strap element of FIG. 12 connected to an electrical receptacle.

The strap element 31 is connected to the housing portion 13 in any suitable manner. For example, as shown in FIGS. 2 and 14, the strap element 31 has a fastener hole 51 adapted to receive a fastener 53 to secure the strap element to the housing portion 13.

The face plate 15 is then disposed over the strap element 31, as shown in FIG. 1, to form the electrical receptacle 11. The wall plate 17 is positioned over the face plate 15 of an electrical receptacle such that the fastener hole 20 in the wall plate 17 is aligned with the fastener hole 60 in the face plate 15, which are both aligned with the first opening 33 in the strap element 31.

The first fastener 41 is pushed into the fastener holes 20 and 60 in the wall plate 17 and face plate 15, respectively, and further into the first opening 33 in the strap element 31. The first fastener 41 engages the free end 125 of the resilient member 23 connected to the strap element 31 of the electrical receptacle 11 and flexes the resilient member in the direction of insertion of the first fastener, thereby securing the wall plate 17 and the face plate 15 to the electrical receptacle 11.

After the first fastener 41 is inserted axially, the first fastener may be slightly rotated to further secure the first fastener therein. A portion of the first opening 33, such as the inwardly extending lip 87 (FIG. 3) or the arcuate portion 187 (FIG. 7) and the free end 25 of the resilient member 23 that engage the first fastener act as a thread to facilitate rotating the first fastener with a tool 91 after having pushed in the first fastener. The quick clip assembly according to the exemplary embodiments of the present invention expedites the wall plate mounting procedure compared to a conventional arrangement in which the fastener must be rotated throughout its entire insertion. The first fastener 41 may be removed by unthreading it.

While advantageous embodiments have been chosen to illustrate the invention, it will be understood by those skilled in the art that various changes and modifications may be made therein without departing from the scope of the invention as defined in the appended claims.

What is claimed is:

1. A quick clip assembly for a strap element of an electrical receptacle, comprising:
    a strap element connectable to an electrical receptacle, said strap element having an opening therein receiving a fastener; and
    a resilient member connected to said strap element and having a free end overlying said strap element opening, said free end of said resilient member flexing when engaging said fastener inserted through said strap element opening, said free end having first and second fingers between which said fastener passes and is received.

2. A quick clip assembly for a strap element of an electrical receptacle according to claim 1, wherein
    said free end of said resilient member has a substantially arcuate portion to facilitate engaging said fastener.

3. A quick clip assembly for a strap element of an electrical receptacle according to claim 1, wherein
    said resilient member is connected to an upper surface of said strap element.

4. A quick clip assembly for a strap element of an electrical receptacle according to claim 1, wherein
    said resilient member is connected to a lower surface of said strap element.

5. A quick clip assembly for a strap element of an electrical receptacle according to claim 3, wherein
    said free end of said resilient member extends into said strap element opening.

6. A quick clip assembly for a strap element of an electrical receptacle according to claim 1, wherein
    a lip extends inwardly from said strap element into said strap element opening such that the fastener is receivable between said lip and said free end of said resilient member.

7. A quick clip assembly for an electrical receptacle according to claim 1, wherein
    said opening in said strap element has an arcuate portion to receive said fastener.

8. A quick clip assembly for an electrical receptacle according to claim 1, wherein
    said strap element has at least one fastener hole to receive a fastening member to secure the strap element to the electrical receptacle.

9. A quick clip assembly for an electrical receptacle according to claim 1, wherein
    said strap element has at least one ground opening adapted to receive a prong of a plug.

10. A quick clip assembly for an electrical receptacle according to claim 1, wherein
    a tab extends outwardly from the strap element and has an opening therein to receive a fastener.

11. An electrical receptacle, comprising:
    a housing;
    a strap element connected to said housing, said strap element having a first opening therein;
    a resilient member connected to said strap element such that a free end of said resilient member overlies said strap element opening;
    a face plate covering said housing and said strap element, said face plate having a second opening therein; and
    a fastener received in said second opening in said face plate and in said first opening in said strap element, said fastener flexing said free end of said resilient member toward said housing to facilitate retention of said fastener.

12. An electrical receptacle according to claim 11, wherein
    a wall plate has a third opening and is disposed over said face plate such that said fastener is inserted through said third opening in said wall plate, through said second opening in said face plate and through said first opening in said strap element to secure said wall plate to said housing.

13. An electrical receptacle according to claim 11, wherein
    said free end of said resilient member has a substantially arcuate portion to receive said fastener.

14. An electrical receptacle according to claim 11, wherein
    said resilient member is connected to an upper surface of said strap element.

15. An electrical receptacle according to claim 14, wherein
    said free end of said resilient member extends into said strap element opening.

16. An electrical receptacle according to claim 11, wherein
    said resilient member is connected to a lower surface of said strap element.

17. An electrical receptacle according to claim 11, wherein
    a lip extends inwardly from said strap element into said first opening such that said fastener is received between said lip and said free end of said resilient member.

18. An electrical receptacle according to claim 11, wherein
    said strap element and said housing have aligned fastener holes to facilitate securing said strap element to said housing.

19. An electrical receptacle according to claim 11, wherein said strap element has at least one ground opening adapted to receive a prong of a plug inserted through said face plate.

20. An electrical receptacle according to claim 11, wherein a tab extends outwardly from the strap element and externally of said housing, and has an opening therein receiving a fastener.

21. A method of securing a wall plate to an electrical receptacle, comprising the steps of
positioning a wall plate over a face plate of an electrical receptacle such that a first fastener hole in the wall plate is aligned with a second fastener hole in the face plate and a third fastener hole in a stap element connected to the electrical receptacle; and
pushing a fastener into the first, second and third fastener holes without substantial rotation such that the fastener engages a resilient member connected to a strap element of the electrical receptacle, thereby securing the wall plate to the electrical receptacle.

22. A method of securing a wall plate to an electrical receptacle according to claim 21, further comprising
rotating the inserted fastener to more securely retain the wall plate to the electrical receptacle after the pushing step.

* * * * *